United States Patent
Stenström et al.

(10) Patent No.: US 6,711,393 B1
(45) Date of Patent: Mar. 23, 2004

(54) RADIO RECEIVER

(75) Inventors: Niklas Stenström, Helsingborg (SE); Bengt Lindoff, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 541 days.

(21) Appl. No.: 09/695,681

(22) Filed: Oct. 24, 2000

(30) Foreign Application Priority Data

Oct. 29, 1999 (GB) .............................................. 9925631

(51) Int. Cl.$^7$ ................................................. H04B 1/10
(52) U.S. Cl. ........................ 455/284; 455/324; 455/304
(58) Field of Search ................................ 455/324, 304, 455/305, 214, 312, 338, 295, 296, 284, 67.6, 130, 269; 375/319, 342, 346, 350, 235, 341, 229; 370/527, 529, 441, 350, 442, 342, 480

(56) References Cited

U.S. PATENT DOCUMENTS

| | | | | |
|---|---|---|---|---|
| 4,249,252 A | * | 2/1981 | Hofmeister | 370/100 |
| 5,319,679 A | | 6/1994 | Bagby | 375/106 |
| 5,724,653 A | * | 3/1998 | Baker et al. | 455/296 |
| 5,798,724 A | | 8/1998 | Myers | 341/146 |
| 5,838,735 A | * | 11/1998 | Khullar | 375/319 |
| 6,151,328 A | * | 11/2000 | Kwon et al. | 370/441 |
| 6,263,030 B1 | * | 7/2001 | Khayrallah | 375/341 |
| 6,426,972 B1 | * | 7/2002 | Endres et al. | 375/229 |
| 6,445,736 B1 | * | 9/2002 | Wheeler | 375/235 Q |
| 6,463,105 B1 | * | 10/2002 | Ramesh | 375/262 |
| 6,470,030 B1 | * | 10/2002 | Park et al. | 370/480 |
| 6,504,884 B1 | * | 1/2003 | Zvonar | 375/346 |
| 2002/0173286 A1 | * | 11/2002 | Lindoff et al. | 455/295 |

FOREIGN PATENT DOCUMENTS

| | | | | |
|---|---|---|---|---|
| EP | 0474615 A2 | 3/1992 | | |
| EP | 0840484A2 A3 | 5/1998 | | |
| EP | 0895385 A1 | 2/1999 | | |
| EP | 0921663 A2 | 6/1999 | | |
| EP | 0948128 A1 | 6/1999 | | |
| EP | 0964557 A1 | 12/1999 | | |
| GB | 2274759 A | * | 8/1994 | .......... H04L/25/06 |
| GB | 2 328 353 A1 | 2/1999 | | |
| WO | WO 98/16039 | 4/1998 | | |
| WO | WO 98/25351 A | 6/1998 | | |

OTHER PUBLICATIONS

British Patent Office Search Repot Under Section 17 for GB 9925631.5 dated Apr. 28, 2000 (1 page).
RWS Group (London, England), letter and novelty search report dated Jun. 28, 1999 (3 pages).
International Search Report for PCT/EP00/10519 dated Mar. 6, 2001. (7 pages).

* cited by examiner

*Primary Examiner*—Quochien B. Vuong
*Assistant Examiner*—C. Chow
(74) *Attorney, Agent, or Firm*—Jenkens & Gilchrist, P.C.

(57) ABSTRACT

A direct conversion receiver is disclosed, in which a DC offset is estimated in two stages. A coarse DC estimation is performed, and the estimate is removed from the received sequence. Then, a coarse synchronization is performed in order to estimate the synchronization position within the burst. Subsequently, a coarse channel estimation and a finer DC estimation are performed simultaneously, and the refined DC estimate is removed. Finally, a refined synchronization and channel estimation are performed, and the refined estimate of the channel is fed to an equaliser, which acts on the received signal, after removal of the refined estimate of the DC component.

10 Claims, 2 Drawing Sheets

RADIO RECEIVER

TECHNICAL FIELD OF THE INVENTION

This invention relates to a radio receiver, and in particular to a radio receiver for use in a digital Time Division Multiple Access (TDMA) communication system, such as the GSM cellular radio telephone system.

BACKGROUND OF THE INVENTION

In a transmitter of a digital radio communications system, information bits are mapped to waveforms that modulate a carrier signal. In the receiver, the transmitted sequence of bits is retrieved by demodulation of the received signal.

A generally efficient design of receiver circuit is the direct conversion, or homodyne, radio receiver, in which the received carrier signal is directly downconverted to baseband, without use of any intermediate frequencies. This architecture can be efficient in terms of cost, size and current consumption.

One problem which can arise in a direct conversion receiver is distortion due to a DC offset. DC offset can arise in the baseband or radio parts of the transmitter, or, more commonly, in the baseband or radio parts of the receiver circuit. More specifically, the main causes of DC offset in the receiver are: transistor mismatch in the signal path; the local oscillator signal leaking into the received signal and self-downconverting to DC in the mixer; and a large near-channel interferer leaking into the local oscillator and self-downconverting to DC.

As a result of these sources, the DC offset signal can in fact be several dB larger than the magnitude of the information signal. It is thus apparent that the DC offset must be removed before the data can be satisfactorily recovered.

An important part of the demodulation process in a digital TDMA receiver is the synchronization. The purpose of synchronization is to find the position of the symbol in a received signal burst. This is made possible by transmitting a specific symbol pattern known as the training sequence within the burst. The training sequence is known to the receiver. Then, the receiver can carry out a correlation between the received signal and the known training sequence, in order to find the synchronization position. The training sequences used within the system are designed in such a way that the synchronization performance is optimised when the received burst is a filtered version of the transmitted symbols plus white noise.

Thus, a received radio signal is downconverted, low-pass filtered, and sampled in a radio receiver front-end circuit. As is known, the sampled signal y(t) can be described by:

$$y(t) = h(0)u(t) + h(1)u(t-1) + \ldots + h(L)u(t-L) + e(t)$$
$$= HU(t) + e(t)$$

where H=[h(0), . . . , h(L)] is a complex valued vector representing the radio channel, and U(t)=[u(t), . . . , u(t-L)] is a complex valued representation of the transmitted symbol at time t, t-1, . . . , t-L. The signal e(t) is assumed to be white noise.

The sampled signal y(t) is then supplied to a synchronization unit, that correlates the received burst with a training sequence, in order to find the synchronization position. Based on the found synchronization position, a channel estimation unit then estimates the coefficients H which define the radio channel. The estimated channel is then supplied to an equaliser that decodes the received data.

However, in the presence of DC components in the signal which is to be demodulated, the standard synchronization procedure is no longer optimal, and thus the bit error rate in signals received by the receiver may be worsened.

SUMMARY OF THE INVENTION

The present invention relates to a synchronization procedure that provides acceptable performance when the received signal includes a DC offset.

More specifically, according to the invention, the DC offset component is estimated in two stages.

In preferred embodiments of the invention, a coarse DC estimation is performed, and the estimate is removed from the received sequence. Then, a coarse synchronization is performed in order to estimate the synchronization position within the burst. Subsequently, a coarse channel estimation and a finer DC estimation are performed simultaneously, and the refined DC estimate is removed. Finally, a refined synchronization and channel estimation are performed, and the refined estimate of the channel is fed to an equaliser, which acts on the received signal, after removal of the refined estimate of the DC component.

DETAILED DESCRIPTION OF PREFERRED EMBODIMENT

Figure 1:
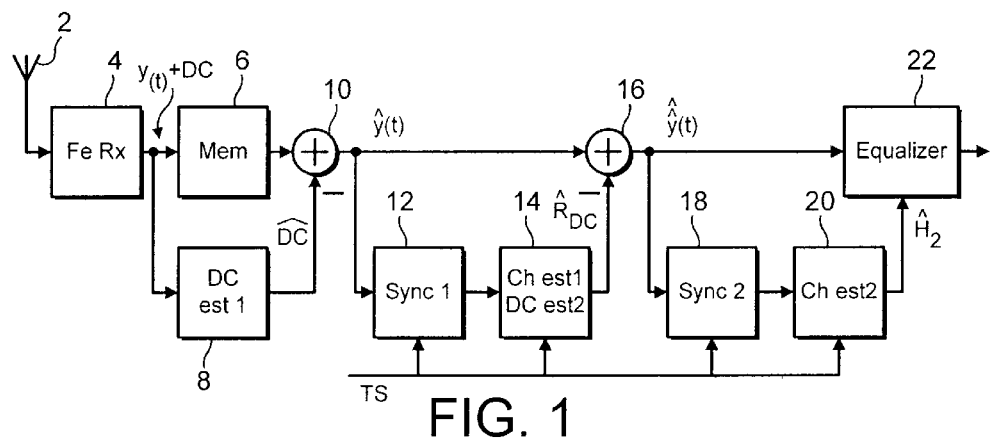
FIG. 1 is a block schematic diagram of a first receiver in accordance with the invention.

FIG. 1 is a block diagram of a radio receiver in accordance with the invention. A radio signal received by an antenna 2 is downconverted, low-pass filtered and sampled in a direct conversion radio receiver front-end circuit 4.

The sampled signal y(t) in the case of a digital transmission can be described according to $$x(t) = y(t) + DC$$
$$= h(0)u(t) + h(1)u(t-1) + \ldots + h(L)u(t-L) + DC + e(t)$$
$$= HU(t) + DC + e(t)$$

where H=[h(0), . . . , h(L)] is a complex valued vector representing the radio channel, and U(t)=[u(t), . . . , u(t-L)] is a complex valued representation of the transmitted symbol at time t, t-1, . . . , t-L. The signal e(t) is assumed to be white noise. DC represents the unknown DC component generated either by the radio transmitter or the radio receiver. The signal y(t) is fed to a memory 6, and also to a first DC estimation unit 8 which makes a coarse DC estimate by taking the average over the burst or over a part of the burst, i.e.

$$\hat{DC} = \frac{1}{N}\sum_k x(k)$$

where N is the number of signals over which the average is calculated. The coarse DC estimate is then subtracted from the signal y(t), in an adder 10, giving a new signal $$\hat{y}(t)=x(t)-\hat{DC}$$

Note that the averaging is performed over a finite number of symbols, implying a biased DC estimate, i.e.

$$\hat{DC}=DC-R_{DC}$$

Where $R_{DC}$ is the residual DC component. Note that $R_{DC}$ is symbol dependant and will vary from burst to burst. Using extended averaging, ideally over an infinite number of bursts, would provide a better estimate of the DC component. This is however not possible since the DC component varies from one burst to the other. Thus, the signal $\hat{y}(t)$ can now be written as $$\hat{y}(t)=y(t)+R_{DC}=HU(t)+R_{DC}+e(t)$$

The signal $\hat{y}(t)$ is then fed to a first synchronization unit 12 that correlates the received burst with a training sequence (TS) in order to find a coarse synchronization position. The calculated coarse synchronization position is then fed to a first channel estimation unit 14 that estimates the radio channel and the residual DC offset, i.e. the coefficients H and $R_{DC}$ simultaneously. This can be achieved using standard Least-Squares estimation techniques, by extending the channel model to include a DC tap. The estimated residual DC component $\hat{R}_{DC}$ is then output from the channel estimation unit and subtracted from $\hat{y}(t)$, in a second adder 16, giving a new signal $\hat{\hat{y}}(t)$. This signal can now be assumed to be written according to:

$$\hat{\hat{y}}(t)=h(0)u(t)+h(1)u(t-1)+\ldots+h(L)u(t-L)+e(t)=HU(t)+e(t)$$

The signal $\hat{\hat{y}}(t)$ is then fed to a second synchronization unit 18 that correlates the received burst with the training sequence (TS) in order to find a better synchronization position. The synchronization position is then fed to a second channel estimation unit 20, that estimates the radio channel, i.e. the coefficients H, in the same way as described before. The estimated channel $\hat{H}_2$ together with the signal $\hat{\hat{y}}(t)$ is then fed to an equalizer 22 for further processing.

Figure 2:
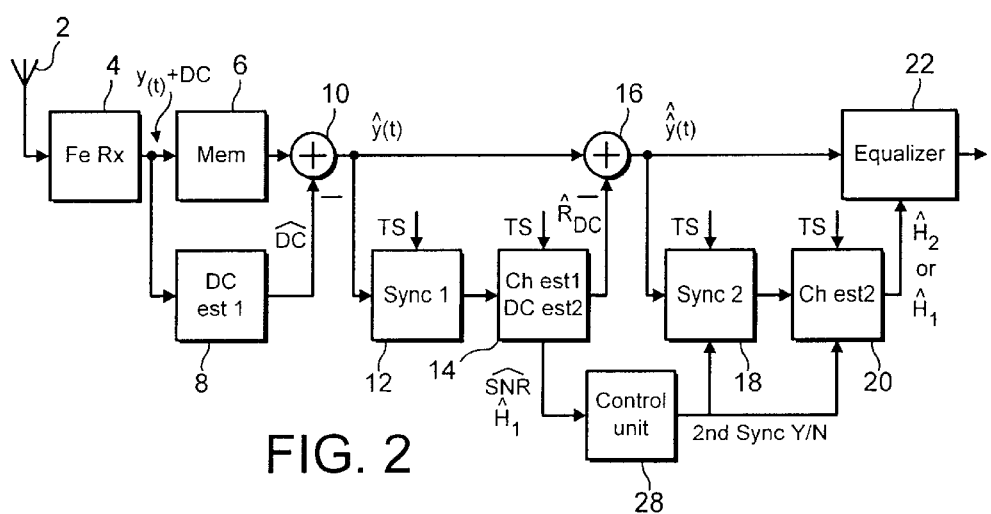
FIG. 2 is a block schematic diagram of a second receiver in accordance with the invention.

FIG. 2 shows an alternative embodiment of the invention.

The performance gain made by doing an extra synchronization and channel estimation is obtained when the signal quality is good. Thus, in order to save current, which will for example give longer stand-by and talk-time in a mobile telephone, one can make a decision whether or not to carry out the second synchronization and channel estimation. Components of the circuit of FIG. 2 which correspond to those of the circuit of FIG. 1 are given the same reference numerals. In the circuit of FIG. 2, the first DC estimation, synchronization and channel estimation are prepared as before. The estimated channel filter taps together with a measure of the signal quality, e.g. an estimate of the Signal to Noise Ratio (SNR), are fed from the first channel estimation unit 14 to a control unit 28 that decides whether or not the second synchronization and channel estimation are to be carried out. If the SNR is above a threshold, the second synchronization and channel estimation are performed. Otherwise, they are not. If so, the second synchronization and channel estimation are performed as described above. If not, the signal $\hat{y}(t)$ and the channel estimate $\hat{H}_1$ are fed to the equalizer 22 that decodes the data.

Figure 3:
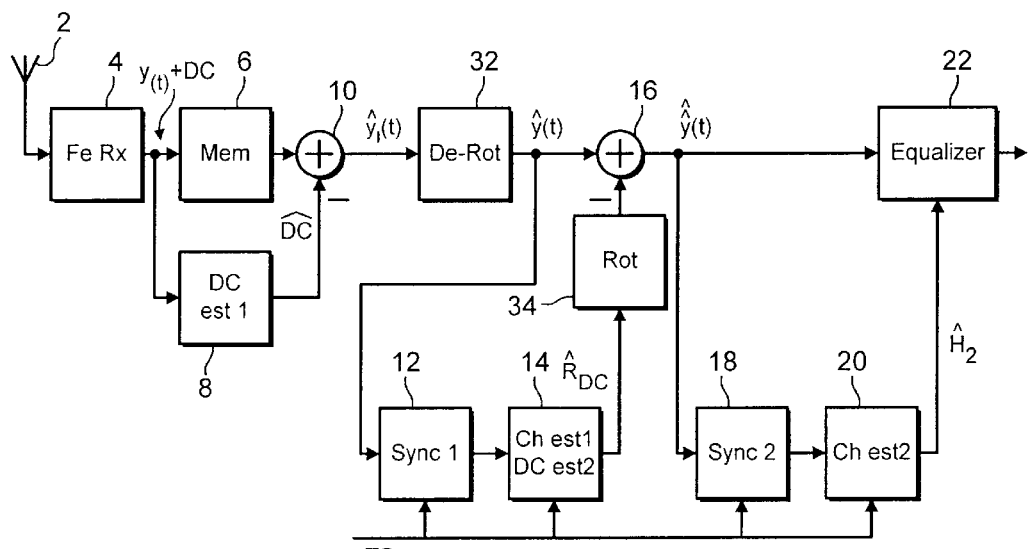
FIG. 3 is a block schematic diagram of a third receiver in accordance with the invention.

FIG. 3 shows a further alternative embodiment of the invention.

In some cellular systems, phase offset, i.e. a phase shift between transmitted symbols, is introduced in the transmitted symbols. This phase offset is introduced in order to facilitate implementation of the transmitter architecture. For instance, the new cellular system EDGE (Enhanced Data rates for GSM Evolution) uses 8-PSK modulation with a phase shift (phase offset) of 67.5° between transmitted symbols. In order to compensate for this phase shift in the receiver the received signal has to be de-rotated. However, a de-rotation of a signal with a DC component gives a signal with a rotating DC component.

FIG. 3 shows a suitable receiver for this situation. Again, components of the circuit of FIG. 3 which correspond to those of FIG. 1 are given the same reference numerals. In the circuit of FIG. 3, the first coarse DC estimation and DC subtraction are performed as described above. The signal $\hat{y}_1(t)$ is then de-rotated in a de-rotator 32 with a phase shift $(-\theta)$ corresponding to the offset $(\theta)$ introduced in the transmitter. The output $\hat{y}(t)$ from the de-rotator 32 is then fed to the first synchronization unit 12 that estimates a synchronization position. This position is then fed to the channel estimation unit 14 that estimates the channel filter taps and the residual DC component, taking into account the rotating behaviour of the DC component. This can again be done by using standard Least-Squares estimation techniques. The estimate of the residual DC offset is output to a rotation unit 34 that applies an appropriate rotation of the residual DC component, and it is subtracted from the signal $\hat{y}(t)$, giving a signal $\hat{\hat{y}}(t)$. The further processing of the signal $\hat{\hat{y}}(t)$ is carried out as described above.

Further, in this case one can add a control unit that decides whether the second synchronization and channel estimation are to be carried out or not, as described with reference to FIG. 2.

Figure 4:
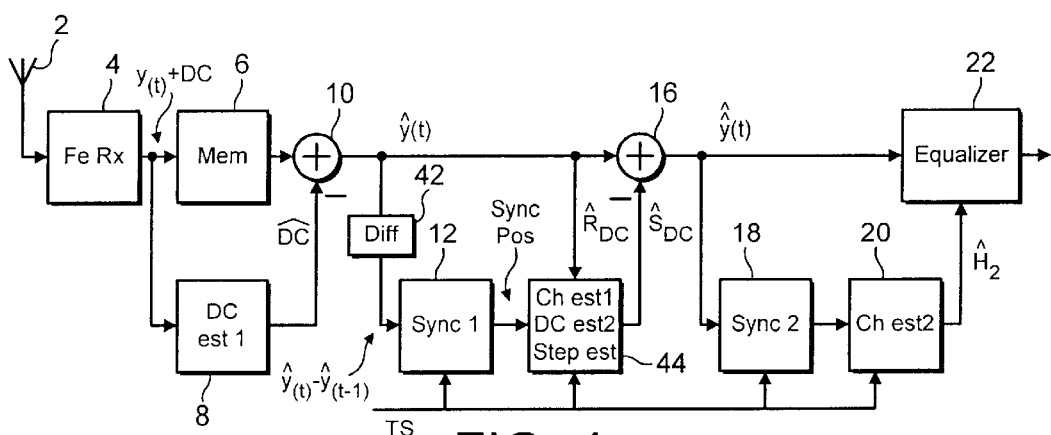
FIG. 4 is a block schematic diagram of a fourth receiver in accordance with the invention.

FIG. 4 shows a further alternative embodiment of the invention.

When using a direct conversion receiver, a nearby interferer will cause a DC-step when ramping up its signal. This DC-step may or may not degrade synchronization performance if located in the training sequence. Components of the circuit of FIG. 4 which correspond to those of FIG. 1 are given the same reference numerals. The circuit of FIG. 4 allows the impact of such a DC-step to be minimized.

First the signal $\hat{y}(t)$ is calculated as before using averaging of the received samples over the burst. Samples are then differentiated in a differentiator 42, i.e. $\hat{y}(t)-\hat{y}(t-1)$ is calculated, and passed on to the synchronization unit 12 which estimates a first synchronization position. The differentiation is used in order to reduce the impact of the DC step when doing the first synchronization. The synchronization position is then fed to the channel estimation unit 44 together with the undifferentiated samples $\hat{y}$. The channel estimation unit now estimates the channel filter taps and the residual DC component, also taking the DC-step into account. That is, the model to be estimated is $\hat{y}=HU+DC+a^*S_{DC}(k)$, where a is the unknown step level and the step signal $S_{DC}(k)$ consists of k−1 consecutive zeros and M−k consecutive ones, where M is the number of symbols in the training sequence. Since the position k of DC-step $S_{DC}$ is unknown means must be taken to:

1. Assume that the DC-step occurs at the middle of the training sequence or,

2. Use information from differentiation which will result in a peak at the position of the DC-step or,
3. Evaluate all possible positions k in the training sequence. Minimize the error made using these different positions in estimating the model. That is, for each position k in the training sequence, estimate the model ŷ(k)–HU+DC+S$_{DC}$(k). Calculate the difference with the received symbols, $$Err(k) = \sum_{l=1}^{M} y_l - \hat{y}_l(k),$$

find k that minimizes Power[Err(k)].

This can again be done by using standard Least-Squares estimation techniques. The estimate of the residual DC offset together with the estimated DC-step and its associated position are then subtracted from the signal ŷ(t), giving a signal ỹ(t). The further processing of the signal ỹ(t) is done as described above.

Again, in this case one can add a control unit as shown in FIG. 2 that decides whether the second synchronization and channel estimation is to be carried out or not. Further, in case of phase offset in the modulation, the same de-rotation technique as described with reference to FIG. 3 can be used in this case also. Finally, the above mentioned method in order to take care of DC step can also be done without the differentiation unit, implying the first synchronization is done on the ordinary signal.

There are thus described radio receivers which provide improved synchronization in the presence of a DC offset component.

What is claimed is:

1. A radio receiver, comprising:
   a front end circuit for sampling a received signal to produce a sampled received signal containing a DC offset;
   a first offset estimation circuit, for producing a first estimate of the DC offset from the sampled received signal;
   a first subtractor, for subtracting the first estimate of the DC offset from the sampled received signal to produce a first estimated sampled signal including a residual DC offset;
   a first synchronization detection circuit, for estimating a synchronization position of the first estimated sampled signal;
   a first channel estimator, for producing a first channel estimate based on the estimated synchronization position;
   a second offset estimation circuit, for producing a second estimate of the residual DC offset in the first estimated sampled signal, after estimation of the synchronization position;
   a second subtractor, for producing a second estimated sampled signal by subtracting the second estimate of the residual DC offset from the first estimated sampled signal;
   a second synchronization detection circuit, for estimating a synchronization position of the second estimated sampled signal;
   a second channel estimator, for producing a second channel estimate based on the second estimated synchronization position;
   an equalizer, for processing the second estimated sampled signal based on the second channel estimate; and
   a control unit, for determining whether or not to apply signals to the second synchronization detection circuit and the second channel estimator based on an estimate of the signal quality.

2. A radio receiver as claimed in claim 1, wherein the first channel estimator estimates the signal quality, and the control unit determines that signals are applied to the second synchronization detection circuit and the second channel estimator only when the estimated signal quality exceeds a threshold.

3. A radio receiver as claimed in claim 1, wherein, if the control unit determines not to apply signals to the second synchronization detection circuit and the second channel estimator, the equalizer uses the first channel estimate to process the second estimated sampled signal.

4. A radio receiver as claimed in claim 1, further comprising:
   a derotator, for applying a negative rotation to the first estimated sampled signal; and
   a rotator, for applying a rotation to the second estimate of the DC offset.

5. A radio receiver as claimed in claim 1, further comprising:
   a differentiator, for calculating a differential value of the first estimated sampled signal, before application thereof to the first synchronization circuit, and
   a step estimator, for estimating a magnitude of a DC step in the received signal,
   wherein the second subtractor subtracts the estimate of the magnitude of the DC step from the first estimated sampled signal.

6. A method of processing a received signal, comprising:
   sampling the received signal to produce a sampled received signal containing a DC offset;
   producing a first estimate of the DC offset from the sampled received signal;
   subtracting the first estimate of the DC offset from the sampled received signal to produce a first estimated sampled signal including a residual DC offset;
   estimating a synchronization position of the first estimated sampled signal;
   producing a first channel estimate based on the estimated synchronization position;
   producing a second estimate of the residual DC offset from the first estimated sampled signal after estimation of the synchronization position;
   producing a second estimated sampled signal by subtracting the second estimate of the residual DC offset from the first estimated sampled signal and the second estimate of the DC offset;
   estimating a synchronization position of the second estimated sampled signal;
   producing a second channel estimate based on the second estimated synchronization position;
   processing the second estimated sampled signal in an equalizer based on the second channel estimate; and
   determining whether or not to estimate the synchronization position of the second estimated sampled signal and to produce the second channel estimate, based on an estimate of the signal quality.

7. A method as claimed in claim 6, comprising estimating the signal quality, and determining that the synchronization position of the second estimated sampled signal be estimated, and the second channel estimate be produced, only when the estimated signal quality exceeds a threshold.

8. A method as claimed in claim 6, comprising, if it is determined not to estimate the synchronization position of the second estimated sampled signal or to produce the second channel estimate:

processing the second estimated sampled signal in an equalizer based on the first channel estimate.

9. A method as claimed in claim 6, further comprising:

applying a negative rotation to the first estimated sampled signal; and for applying a rotation to the second estimate of the DC offset.

10. A method as claimed in claim 6, further comprising:

calculating a differential value of the first estimated sampled signal, before application thereof to the first synchronization circuit, estimating a magnitude of a DC step in the received signal, and subtracting the estimate of the magnitude of the DC step from the first estimated sampled signal.

* * * * *